US006441719B1

(12) United States Patent

Tsui

(10) Patent No.: US 6,441,719 B1

(45) **Date of Patent: *Aug. 27, 2002**

(54) REMOTE SIGNALING DEVICE FOR A ROLLING CODE SECURITY SYSTEM

(76) Inventor: Philip Y. W. Tsui, 3513 Ingram Rd., Mississauga (CA), L5L 4M4

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/223,593

(22) Filed: Dec. 30, 1998

Related U.S. Application Data

(63) Continuation-in-part of application No. 09/023,393, filed on Feb. 13, 1998.

(51) Int. Cl.[7] .................................................. H04B 1/00

(52) U.S. Cl. ........................ 340/5.21; 340/5.1; 340/5.2; 340/5.8; 340/825.69; 340/825.72; 341/173

(58) Field of Search ....................... 340/825.31, 825.34, 340/825.69, 825.73, 524, 825.72, 870.11, 5.1, 5.2, 5.8, 5.21; 341/173

(56) References Cited

U.S. PATENT DOCUMENTS

| | | | | |
|---|---|---|---|---|
| 4,772,876 A | | 9/1988 | Laud | |
| 4,885,803 A | | 12/1989 | Hermann et al. | 455/603 |
| 5,055,701 A | | 10/1991 | Takeuchi | 307/10.2 |
| 5,382,948 A | * | 1/1995 | Richmond | 340/825.36 |
| RE35,364 E | | 10/1996 | Heitschel et al. | 364/400 |
| 5,563,600 A | | 10/1996 | Miyake | 341/173 |
| 5,594,429 A | | 1/1997 | Nakahara | 340/825.31 |
| 5,650,774 A | | 7/1997 | Drori | 340/825.32 |
| 5,774,064 A | | 6/1998 | Lambropoulos et al. | 340/825.69 |

* cited by examiner

*Primary Examiner*—Brian Zimmerman
*Assistant Examiner*—Yves DaLencourt

(57) ABSTRACT

A signaling device that receives coded signals from a transmitter. The signaling device includes a first circuit that receives a from the transmitter. The first code includes a first identification code and a first variable code. The signaling device further includes a memory that stores a second code. The second code includes a second identification code and a second variable code. The signaling device further includes a second circuit coupled to the first circuit and the memory. The second circuit generates an output signal if the first code matches the second code. The signaling device further includes an annunciator circuit coupled to the second circuit. The annunciator circuit provides a perceivable indicator if the second circuit generates the output signal.

18 Claims, 10 Drawing Sheets

20

REMOTE SIGNALING DEVICE FOR A ROLLING CODE SECURITY SYSTEM

This application is a CIP of Ser. No. 09/023,393 filed Feb. 13, 1998.

BACKGROUND OF THE INVENTION

1. Field of the Invention

This invention is directed in general to security systems and in particular, to a wireless security system in which a signaling device, which operates with a transmitter, is capable of receiving and verifying coded signals from the transmitter. The transmitter transmits the coded signals using a different data frame pattern during each transmission.

2. Prior Art

Transmitter-receiver controller systems are widely used for remote control and/or actuation of devices or appliances such as garage door openers, gate openers, and security systems. For example, most conventional security systems use a transmitter-receiver combination to monitor selected areas. In such conventional security systems, all the peripheral devices such as sensors, and the control unit operate using the same identification code, so that only those devices belonging to a particular installed security system on the premises can operate with each other. Other devices which operate using a different identification code, would be ignored. In more complicated systems, various groups of peripheral devices may be assigned to different zones, each of which is monitored for quick identification in the event of a security breach.

Such conventional security systems create security risks. Since a single, fixed identification code is utilized, the identification code may be detected by a hostile user, and subsequently used to disarm the control unit. Further, a single, fixed identification code may be generated by a non-system source and incorrectly recognized as a system signal.

Accordingly, there is a need in the technology for a security system which provides increased security by having a control unit which operates with a number of peripheral devices, each having different identification codes which cannot be easily detected. In addition, there is a need for a security system which improves receiver immunity to spurious signals by using a different data frame pattern during each transmission.

SUMMARY OF THE INVENTION

A signaling device that receives coded signals from a transmitter is claimed. The signaling device comprises a first circuit that receives a first code from the transmitter. The first code includes a first identification code and a first variable code. The signaling device further comprises a memory that stores a second code. The second code includes a second identification code and a second variable code. The signaling device further comprises a second circuit coupled to the first circuit and the memory. The second circuit generates an output signal if the first code matches the second code. The signaling device further comprises an annunciator circuit coupled to the second circuit. The annunciator circuit provides a perceivable indicator if the second circuit generates the output signal.

DESCRIPTION OF PREFERRED EMBODIMENTS

Figure 1A:
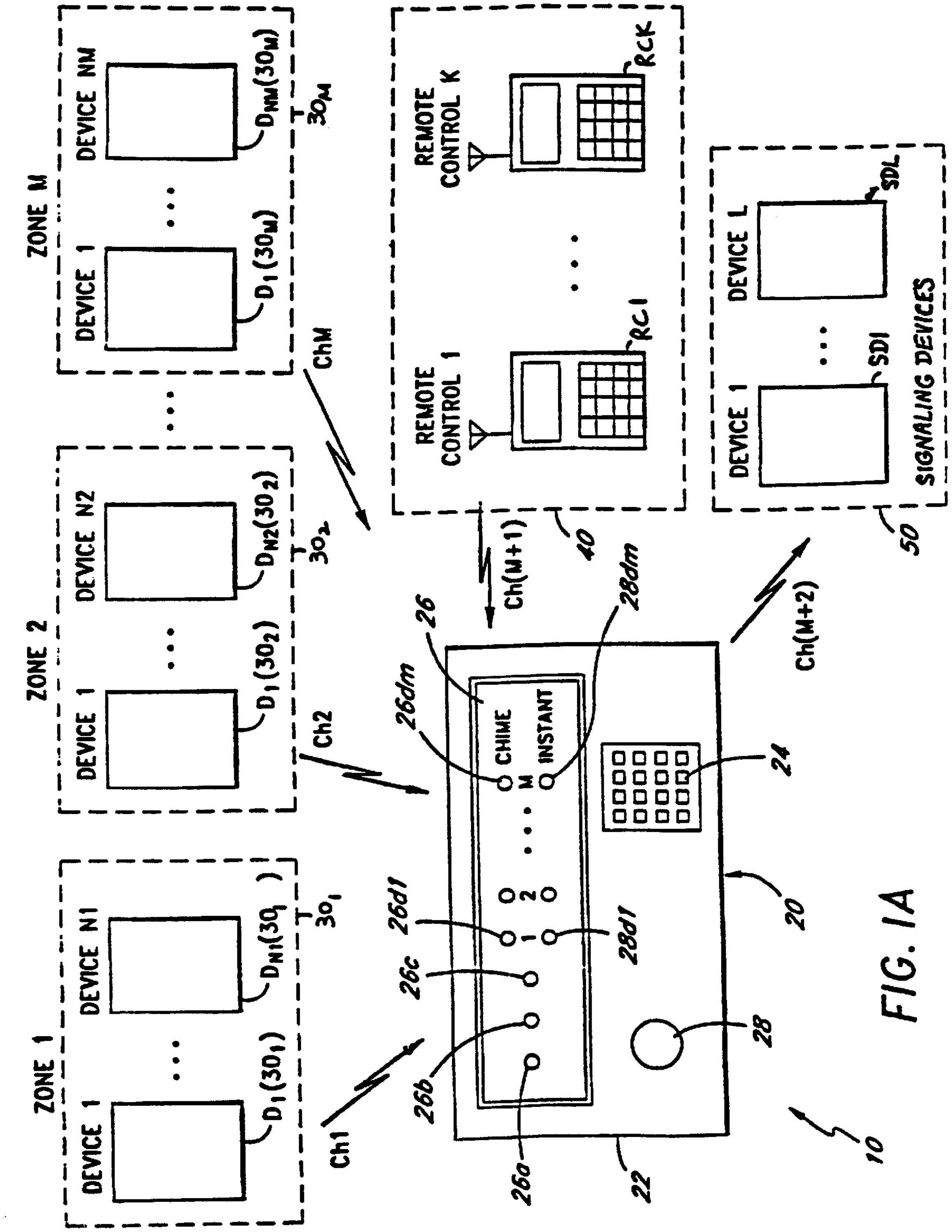
FIG. 1A is a block diagram illustrating one embodiment of the security system of the present invention.

FIG. 1A is a block diagram illustrating one embodiment of the security system of the present invention. The security system 10 comprises a security console 20, a plurality of sets of peripheral devices D1($30_1$)-DN1($30_1$), D1($30_2$)-DN2 ($30_2$), . . . , D1($30_M$)-$DN_M$($30_M$), each of which is allocated to a zone $30_1$, $30_2$, . . . , $30_M$ respectively, a plurality of remote controllers RC1, . . . RCK (collectively referred to as remote controllers 40), and a plurality of signaling devices SD1, . . . , SDL (collectively referred to as signaling devices 50). Examples of signaling devices 50 include bells, sirens, strobe lights, and telephone auto dialers.

In one embodiment, the number of peripheral devices D1($30_1$)-DN1($30_1$), D1($30_2$)-DN2($30_2$), . . . , D1($30_M$)-DNM($30_M$) are equal, i.e., N1=N2=NM. However, in alternate embodiments, any desired number of peripheral devices may be assigned to a particular zone $30_1$, $30_2$, . . . $30_M$. Examples of the peripheral devices include sensors such as motion sensors, door/window contacts, and garage door openers.

The security console 20 comprises a housing 22, a keypad 24, a display panel 26 and a opening 28 which facilitates the projection of audio signals. In one embodiment, the housing 22 is made from plastic through an injection-molding process. In one embodiment, the keypad 24 is an alphanumeric keypad. In an alternate embodiment, the keypad 24 is a numeric keypad. The display panel 26 comprises a first light emitting diode (LED) 26*a* which indicates the security console 20 is powered up, a second LED 26*b* which indicates that the battery supply is low, a third LED 26*c* which indicates that the security console 20 is armed, a first plurality of zone LEDs 26*d*1, . . . , 26*dm* which correspond to the zones $\mathbf{30}_1$, . . . , $\mathbf{30}_m$, each of which will light up indicating that a chime will sound when a corresponding one of the peripheral devices are activated, and a second plurality of zone LEDs 28*d*1, . . . , 28*dm* which correspond to the zones $\mathbf{30}_1$, . . . , $\mathbf{30}_m$, each of which will light up indicating that an alarm will sound instantly when an associated one of the peripheral devices is activated. Selection of either the chime mode or the alarm mode may be made during installation of the security system 10 by configuring the micro-controller 100.

Figure 1B:
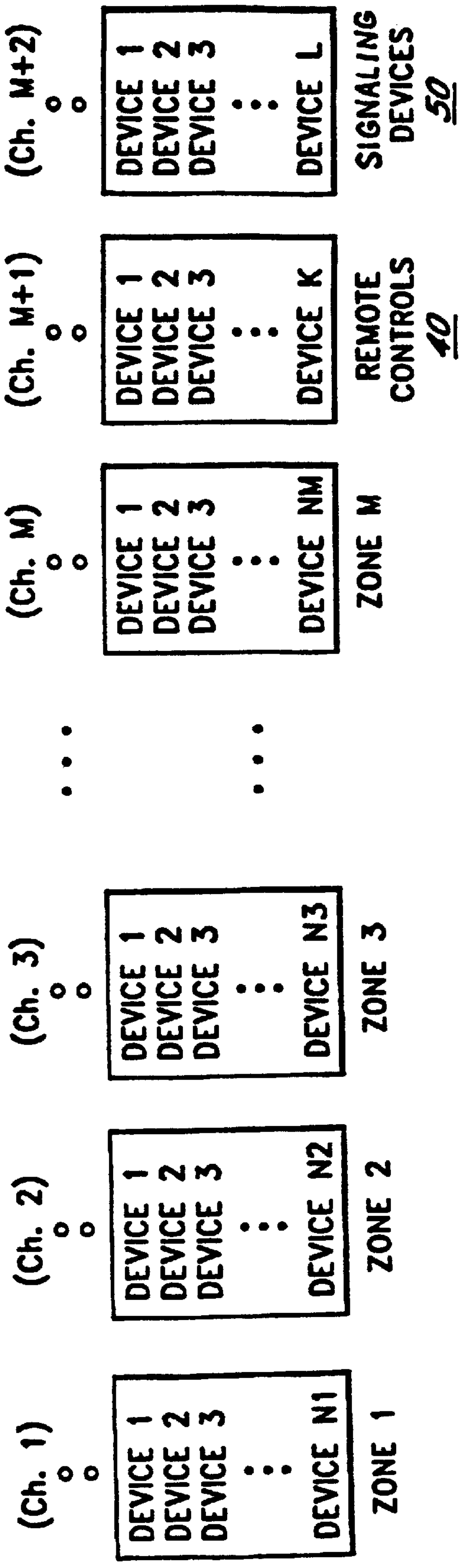
FIG. 1B is a block diagram illustrating one embodiment of the zone/channel organization implemented in the security system of FIG. 1A.

As discussed earlier, each of the peripheral devices D1($\mathbf{30}_1$)-DN1($\mathbf{30}_1$), D1($\mathbf{30}_2$)-DN2($\mathbf{30}_2$), . . . , D1($\mathbf{30}_M$)-DNM($\mathbf{30}_M$), is allocated to a zone $\mathbf{30}_1$, $\mathbf{30}_2$, . . . , $\mathbf{30}_M$ respectively. For example, the user may assign his living room as zone $\mathbf{30}_1$, and install various peripheral devices such as electrical or motion sensors to zone $\mathbf{30}_1$. FIG. 1B is a block diagram illustrating one embodiment of the zone/channel organization implemented in the security system of FIG. 1A. The security console 20 monitors the devices D1($\mathbf{30}_1$)-DN1($\mathbf{30}_1$), D1($\mathbf{30}_2$)-DN2($\mathbf{30}_2$ ), . . . and/or D1($\mathbf{30}_M$)-DNM($\mathbf{30}_M$), corresponding to a zone $\mathbf{30}_1$, $\mathbf{30}_2$, . . . , and/or $\mathbf{30}_M$ respectively, via a plurality of channels Ch1, Ch2, . . . , ChM respectively. Two other channels, namely, ChM+1 and ChM+2 are implemented for reception of signals from one or more remote controllers 40 and transmission of signals to one or more signaling devices 50.

Figure 2A:
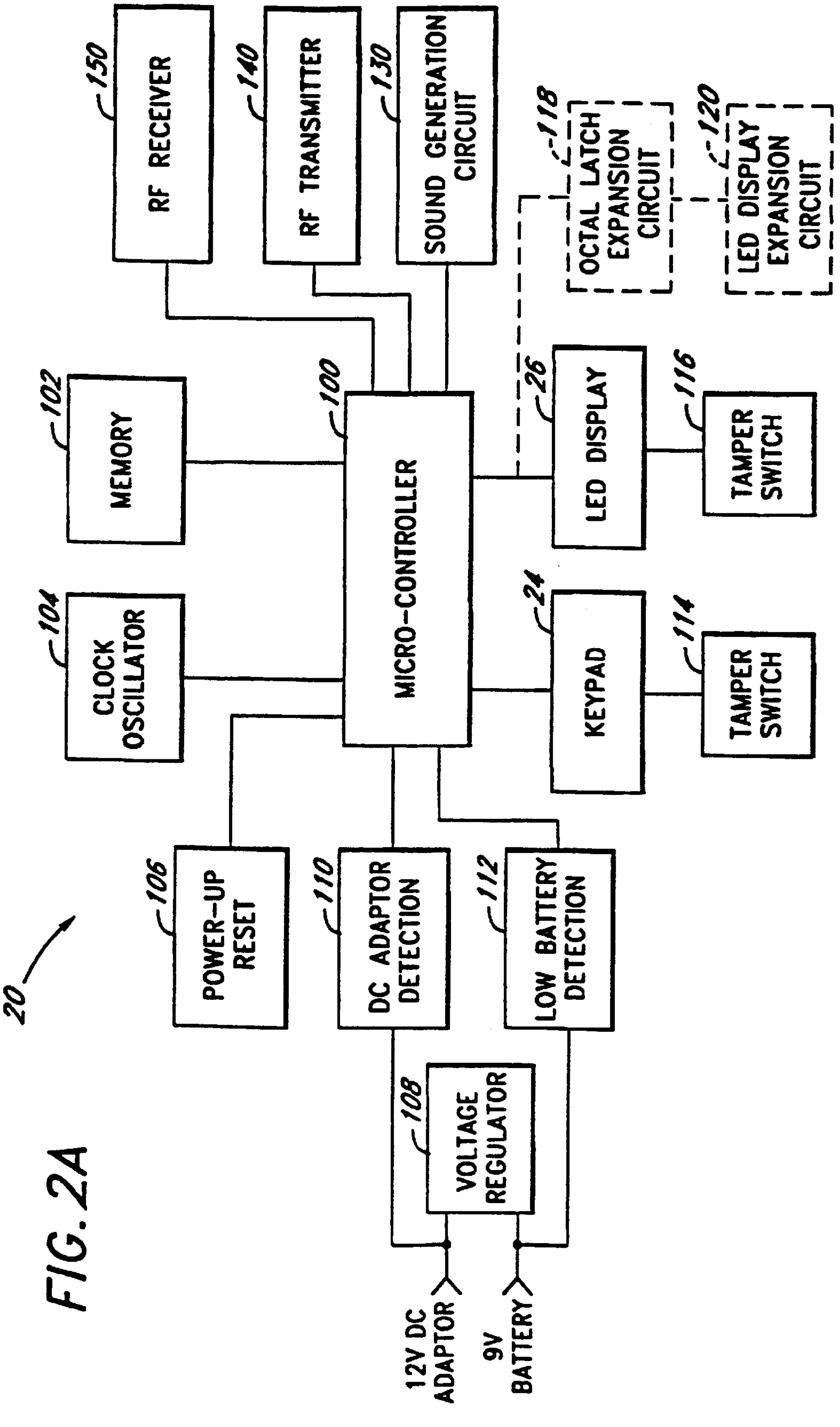
FIG. 2A is a detailed block diagram of one embodiment of the security console 20 of FIG. 1A.

FIG. 2A is a detailed block diagram of one embodiment of the security console 20 of FIG. 1A. The security console 20 comprises a micro-controller 100, memory 102 such as a non-volatile memory, a clock oscillator 104, a powerup reset circuit 106, a voltage regulator 108 which receives current and voltage from either a 12V direct current (DC) source or a 9V battery, a low battery detection circuit 112, the keypad 24 which may be used to enter a password for gaining access to the security console 20, the LEDs on the LED display panel 26, tamper switches 114 and 116 which are coupled to the keypad 24 and LED display panel 26 respectively, an optional octal latch expansion circuit 118, and an optional LED display expansion circuit 120, a sound generation circuit 130, a radio frequency (RF) transmitter 140 and an RF receiver 150. In one embodiment, the micro-controller 100 may be replaced by a processor. The octal latch expansion circuit 118 and the LED display expansion circuit 120 (FIG. 2A) may be implemented in the security console 20 to provide additional storage and input/output capability.

Figure 2B:
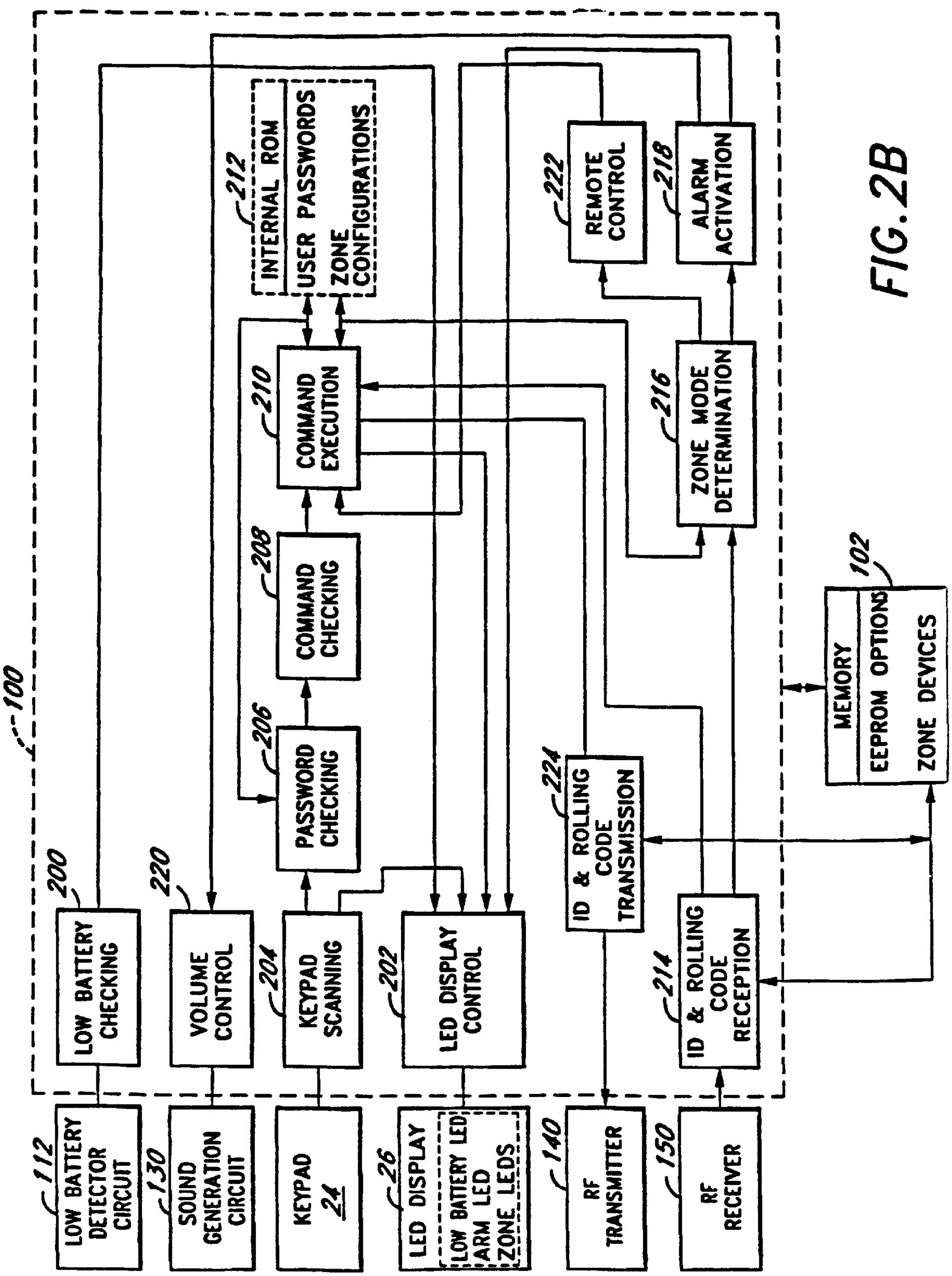
FIG. 2B is one embodiment of a functional block diagram of the micro-controller 100 of FIG. 2A.

FIG. 2B is one embodiment of a functional block diagram of the micro-controller 100 of FIG. 2A. The memory 102 stores information regarding the peripheral devices, e.g. D1($\mathbf{30}_1$)-DN1($\mathbf{30}_1$), D1($\mathbf{30}_2$)-DN2($\mathbf{30}_2$), . . . , D1($\mathbf{30}_M$)-DNM($\mathbf{30}_M$), that are stored in each zone, including the identification codes of each device. In particular, upon activation of each device, a unique identification code and an associated variable security (or rolling) code is transmitted from the device to the security console 20. Memory 102 also stores software which enables the user to assign each device to a particular zone. Such zone assignment or configuration is also stored in memory 102. In one embodiment, each zone corresponds to a particular location of the facility that is being monitored, for example, a first zone may be assigned to include a reception area, while a second zone may be assigned to include a storage room. Alternatively, a first zone may be assigned to include a garage, while a second zone may be assigned to include a bedroom. Upon installing and activating a first device, a signal including a unique identification code and an associated rolling code is transmitted from the first device to the security console. The user may assign the first device to a first monitoring zone to facilitate ease of monitoring. Upon installing a second device in the same general location, a signal including a unique identification code and an associated rolling code is transmitted from the second device to the security console. The user may also assign the second device to the first monitoring zone, to facilitate monitoring of the location of interest. Additional devices for monitoring a selected area may accordingly be assigned to the first monitoring zone.

Likewise, one or more devices may be assigned to one or more additional monitoring zones. In one embodiment, Zone 1 may be assigned to monitor N1 devices, Zone 2 may be assigned to monitor N2 devices, . . . , and Zone M may be assigned to monitor NM devices, where N1, N2 and NM are integers.

The low battery detection circuit 112 provides signals to the microcontroller 100 when the battery level falls below a predetermined level. This signal is monitored by the micro-controller 100 as shown in functional block 200. Upon detection of the predetermined level, the micro-controller 100 sends a command to the LED display 26 to light up the low battery LED 26*b* (see functional block 202). The micro-controller 100 also scans the keypad 24 (functional block 204) to interpret the numerical codes entered via the keypad 24. The micro-controller 100 also determines if the numerical codes entered matches one of the passwords (functional block 206) stored in an internal RAM 212. If so, the micro-controller 100 issues a command that is first verified (functional block 208) and then executed (functional block 210), enabling the user to gain access to the micro-controller 100. The micro-controller 100 also detects the power available provided via either a 12V DC adapter or a battery (see FIG. 2A) and when the security console 20 is powered up, the micro-controller 100 lights up a first light emitting diode (LED) 26*a* which indicates the console is powered up. Upon receiving a user input indicating that the console 20 is armed, the microcontroller 100 lights up a third LED 26*c*. In addition, the micro-controller 100 also controls the status of a first plurality of zone LEDs 26*d*1, . . . , 26*dm* which correspond to the zones 301, . . . , 30*m*, each of which indicate that a chime will sound when an associated one of the peripheral devices are activated, and a second plurality of zone LEDs 28*d*1, . . . , 28*dm* which correspond to the zones 301, . . . , 30m, each of which indicate that an alarm will sound instantly when an associated one of the peripheral devices is activated.

As discussed earlier, the micro-controller 100 also receives signals from the RF receiver 150 (functional block 214), which forwards any received signals from the devices in Zone 1, Zone 2, . . . , Zone M (see FIG. 1) to the micro-controller 100. The signals, include a unique identification code and a variable security or rolling code. The received signal is processed to determine if it originates from one of the monitored zones, and if so, to determine if it is a valid signal (functional block 216). If so, the micro-controller 100 determines if an alarm should be activated (functional blocks 218 and 220) or if a signal should be transmitted to one of the remotely located signaling devices 50, which subsequently dials an outside number, indicating that a security violation has occurred (functional blocks 222, 210, 224 and RF transmitter 140). Such a determination may be accomplished by pre-programming the micro-controller 100.

The micro-controller 100 may likewise receive signals from any one of the remote controllers 40, each of which includes a unique identification code and a variable security or rolling code. The remote controllers 40 may each be carried by an authorized user, for gaining access to the security console 20, for arming or disarming the security console 20 or for actuating one of the peripheral devices of D1($30_1$)-DN1($30_1$), D1($30_2$)-DN2($30_2$), . . . , D1($30_M$)-DNM($30_M$) in the monitored zones. Transmissions initiated by the security console 20 (functional blocks 210, 224) to the signaling devices 50 are accomplished using a signal having a unique identification code and variable security (or rolling) code in accordance with the present invention.

In one embodiment, the security console 20 includes a housing 22 that encloses the above-described circuitry. The housing (including the keypad 24 and LED display 26) is coupled to tamper switches 114 and 116, via a tamper detection circuit (not shown) which determines if the housing is subject to a predetermined level of pressure that is indicative of attempted or actual tampering or breakage. Upon detection of a level that is at or above a predetermined level of pressure, the micro-controller 100 issues a command to either activate an alarm (functional blocks 210, 216, 218) or to transmit a signal to one of the remotely located signaling devices 50, which subsequently dials an outside number, indicating that a security violation has occurred (functional blocks 222, 210, 224 and RF transmitter 140). Such a determination may be accomplished by pre-programming the micro-controller 100.

Figure 3A:
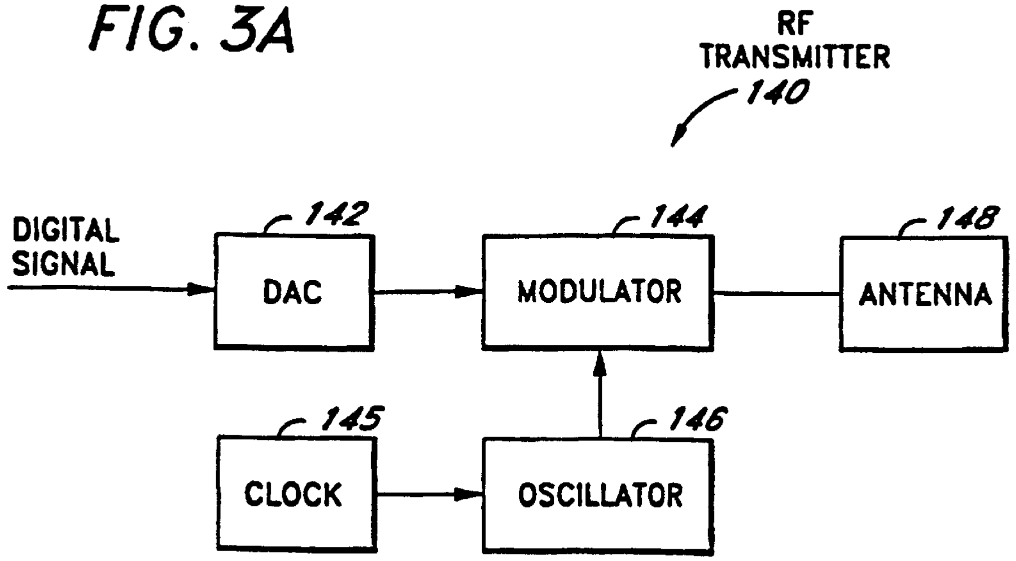
FIG. 3A is a detailed block diagram of one embodiment of the RF Transmitter 140 of FIG. 1A.

FIG. 3A is a detailed block diagram of one embodiment of the RF transmitter 140 of FIG. 2A. The RF transmitter 140 comprises a digital to analog converter 142, which converts the digital signal generated by the micro-controller 100 to an analog signal, a modulator 144, which modulates the analog signal and subsequently provides the modulated analog signal to antenna 148. The modulator 144 receives the carrier frequency from an oscillator 146, which is driven by clock 145.

Figure 3B:
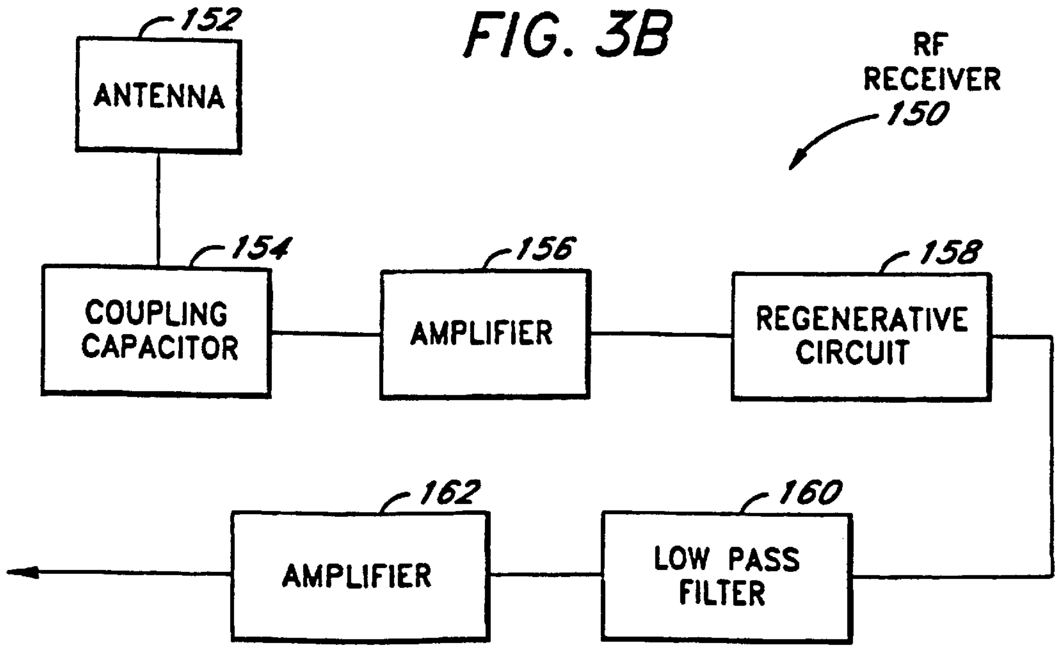
FIG. 3B is a detailed block diagram of one embodiment of the RF Receiver 150 of FIG. 1B.

FIG. 3B is a detailed block diagram of one embodiment of the RF Receiver 150 of FIG. 2A. The RF receiver 150 comprises an antenna 152 for receiving incoming signals, a coupling capacitor 154, an amplifier 156 for amplifying the received signals, a regenerative circuit 158 which performs equalization, timing and decision making processes on the received signals so as to minimize the effects of amplitude and phase distortions on the received signals, a low pass filter 160 for filtering the signals and another amplifier 162 which amplifies the filtered signal. The resulting signal is forwarded to the micro-controller 100.

Figure 4A:
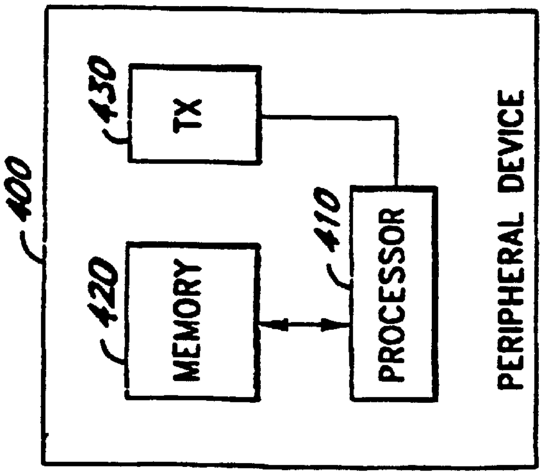
FIG. 4A illustrates one embodiment of any one of the peripheral devices D1($30_1$)-DN1($30_1$), D1($30_2$)-DN2($30_2$), . . . D1($30_M$)-DNM($30_M$) or remote controller 40.
Figure 4B:
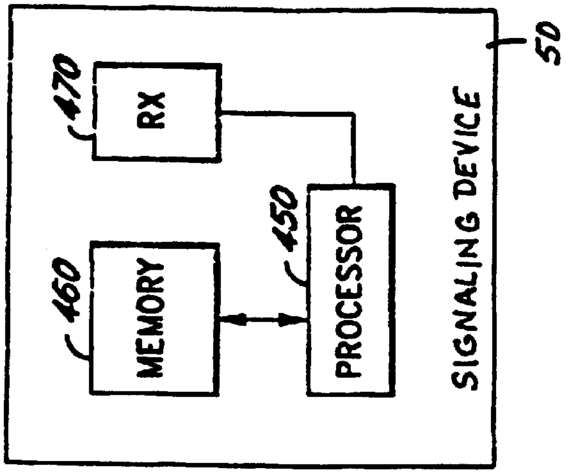
FIG. 4B illustrates one embodiment of any one of the signaling devices 50.

FIG. 4A illustrates one embodiment of any one of the peripheral devices D1($30_1$)-DN1($30_1$), D1($30_2$)-DN2($30_2$), . . . D1($30_M$)-DNM($30_M$) or remote controller 40. The peripheral device 400 comprises a processor 410, memory 420 and a transmitter 430. The transmitter 430 of a peripheral device or remote controller 40 is comparable to the RF transmitter 140 of the security console 20 shown in FIG. 3A. FIG. 4B illustrates one embodiment of any one of the signaling devices 50. The signaling device 50 comprises a processor 450, memory 460 and a receiver 470. The receiver 470 of a signaling device 50 is comparable to the RF receiver 150 of the security console 20 shown in FIG. 3B.

Figure 4C:
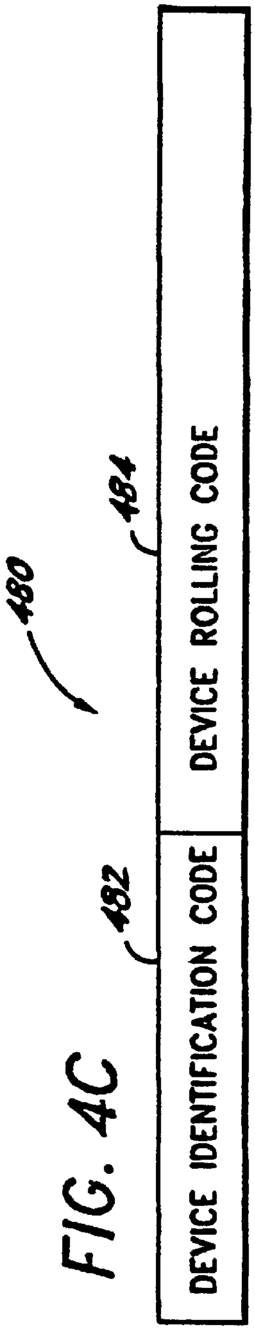
FIG. 4C illustrates the format 480 of the signal transmitted from any of the devices D1($30_1$)-DN1($30_1$), D1($30_2$)-DN2($30_2$), . . . D1($30_M$)-DNM($30_M$), and/or remote controllers 40, to the security console 20, and from the security console 20 to any of the signaling devices 50.

FIG. 4C illustrates the format of the coded signal 480 transmitted from any of the devices D1($30_1$)-DN1($30_1$), D1($30_2$)-DN2($30_2$), . . . D1($30_M$)-DNM($30_M$), and/or remote controllers 40, to the security console 20, and from the security console 20 to any of the signaling devices 50. The coded signal 480 includes a unique and fixed device identification code 482 and a variable device identification code or rolling code 484. The unique identification code 482 of each of the peripheral devices D1($30_1$)-DN1($30_1$), D1($30_2$)-DN2($30_2$), . . . D1($30_M$)-DNM($30_M$), and/or remote controllers 40 is stored in its memory 420. Likewise, the unique identification code 482 of the security console 20 is stored in its memory 102. In addition, software installed in the memory 420 of each of the peripheral devices D1($30_1$)-DN1($30_1$), D1($30_2$)-DN2($30_2$), . . . D1($30_M$)-DNM($30_M$) is executed by the processor 410 during operation of the peripheral device D1($30_1$)-DN1($30_1$), D1($30_2$)-DN2($30_2$), . . . D1($30_M$)-DNM($30_M$) to generate the rolling code 484 in accordance with a predetermined arithmetic equation. Likewise, software installed in the memory 102 of the security console 20 is executed by the micro-controller 100 during operation of the security console 20 to generate the rolling code 484 in accordance with a predetermined arithmetic equation.

Figure 5:
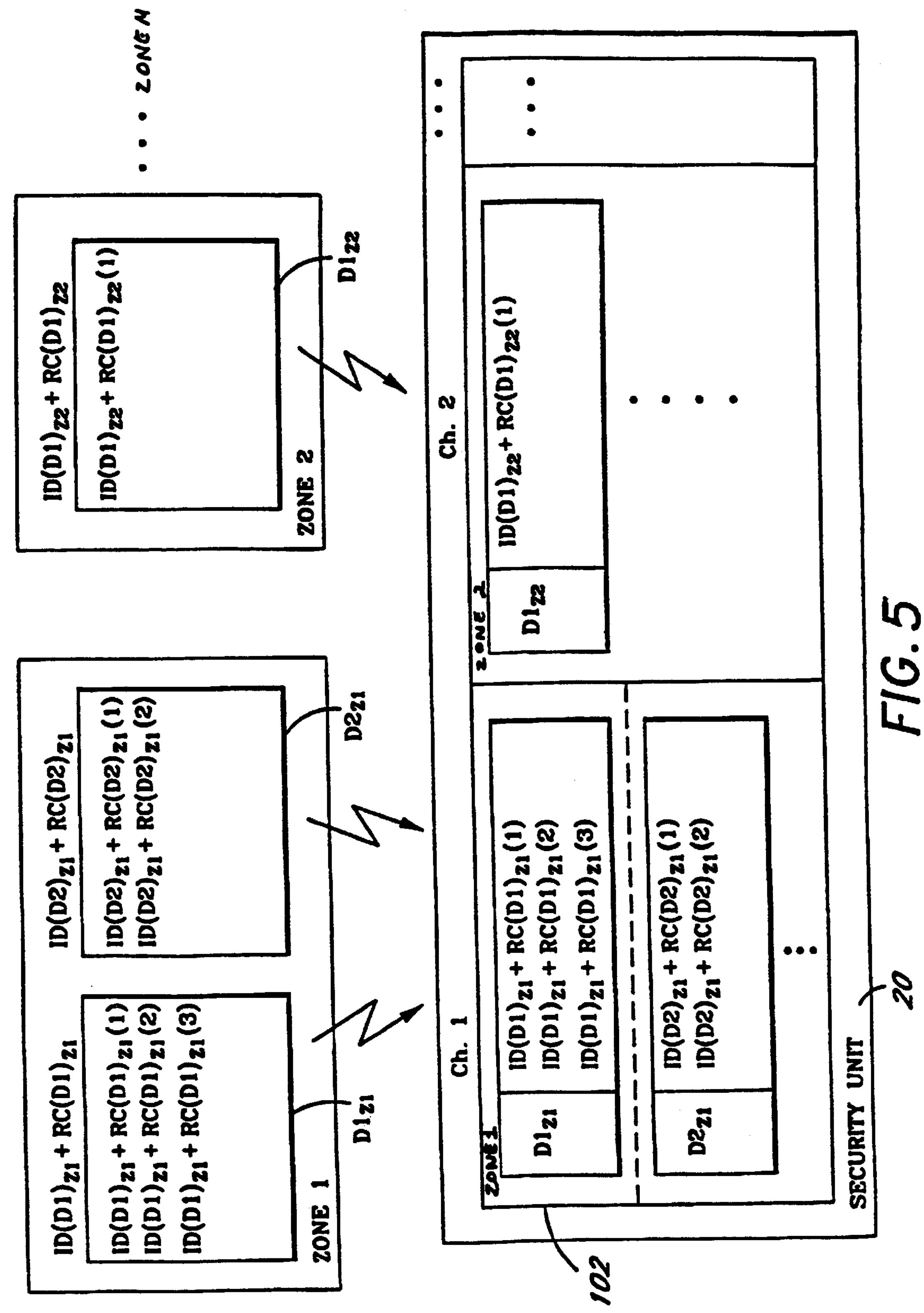
FIG. 5 illustrates one embodiment of the signal identification process implemented in the security system 10 of the present invention.

The software for executing the predetermined arithmetic equation in the security console 20 operates both to generate a code for transmission to a signaling device 50 and to verify a code received from a peripheral device or remote controller 40. Upon initially installing and enabling a peripheral device (any of D1($30_1$)-DN1($30_1$), D1($30_2$)-DN2($30_2$), . . . D1($30_M$)-DNM($30_M$) or remote controller 40; for discussion purposes, $D1_{Z1}$ as shown in FIG. 5 will be referred to), the peripheral device emits a signal to the security console 20, which forwards its unique and fixed device identification code 482 and an initial rolling code 484. The unique identification code 482 and the initial rolling code 484 are stored in the memory 102 of the security console. A similar initialization sequence occurs between the security console 20 and the signaling devices 50, which is described in greater detail below. Since the arithmetic equation for generating the initial and subsequent instances of the rolling code 484 is stored in the memory of both the peripheral device $D1_{Z1}$ and the security console 20, the security console 20 will be able to correctly identify subsequent transmissions from the peripheral device $D1_{Z1}$. In addition, since the rolling code 484 is variable, potential violation of the security system 10 of the present invention will be extremely difficult, especially in cases where the rolling code includes a large string of numbers. As a result, the security of the premises will be greatly enhanced.

The security console 20 is configured to separately monitor the identification code and the rolling code sequence of each activated peripheral device D1($30_1$)-DN1($30_1$), D1($30_2$)-DN2($30_2$), . . . D1($30_M$)-DNM($30_M$), and upon receipt of each signal, the micro-controller 100 would generate the expected rolling code sequence associated with a particular identification code (and hence, a particular peripheral device). If there is a match, the received signal will be considered valid. The associated command (e.g., disarm, initiate transmission due to security breach, or to open a door) will then be acknowledged and the associated action will be taken.

FIG. 5 illustrates one embodiment of the signal identification process implemented in the security system 10 of the present invention. As shown, upon activation of the peripheral device $D1_{Z1}$ in zone 1, a signal which includes the identification code $ID(D1)_{Z1}$ and an initial rolling code $RC(D1)_{Z1}(1)$ is transmitted to the security console 20. As discussed earlier, the initial rolling code $RC(D1)_{Z1}(1)$ and subsequent variations of the rolling code $RC(D1)_{Z1}(n)$ are generated by software installed in memory of the peripheral device $D1_{Z1}$ in accordance with a predetermined arithmetic equation. This software is also installed in the memory 102 of the security console 20.

The identification code $ID(D1)_{Z1}$ and the initial rolling code $RC(D1)_{Z1}(1)$ are received by the security console 20 and stored in memory 102. Upon detection of motion or upon the breaking of a security contact, the peripheral device $D1_{Z1}$ will transmit a second signal to the security console 20. This second signal from the peripheral device $D1_{Z1}$ will include identification code $ID(D1)_{Z1}$ and a second rolling code $RC(D1)_{Z1}(2)$ generated in accordance with the predetermined arithmetic equation. Since the software for generating the rolling code sequences $RC(D1)_{Z1}(1)$, $RC(D1)_{Z1}(2)$, . . . , $RC(D1)_{Z1}(n)$ is also installed on the security console 20, upon receipt of the second signal, the micro-controller 100 (FIG. 2) first generates the expected rolling code $RC(D1)_{Z1}(2)$ associated with the identification code $ID(D1)_{Z1}$ and then compares the received second signal with the identification code $ID(D1)_{Z1}$ and expected rolling code $RC(D1)_{Z1}(2)$. If there is a match, the second signal will be considered a valid signal. In response, the security console 20 may transmit a signal to one of its signaling devices 50 (FIG. 1) (such as an emergency dialer), which subsequently sends a signal to one or more outside phones, to alert designated personnel that there is a security breach. Alternatively, the security console 20 may be configured to generate an alarm or a chime using the sound generation circuit 130. In addition, the associated LED **26*d*1 or 28*d*1 will light up, indicating that there is a security breach in zone 1**.

Upon detection of a further instance of motion or upon the breaking of a security contact, the peripheral device $D1_{Z1}$ will transmit a third signal to the security console 20. This second signal from the peripheral device $D1_{Z1}$ will include identification code $ID(D1)_{Z1}$ and a third rolling code $RC(D1)_{Z1}(3)$ generated in accordance with the predetermined arithmetic equation. Upon receipt of the third signal, the micro-controller 100 (FIG. 2) generates the expected rolling code $RC(D1)_{Z1}(3)$ associated with the identification code $ID(D1)_{Z1}$ and then compares the received second signal with the identification code $ID(D1)_{Z1}$ and expected rolling code $RC(D1)_{Z1}(3)$. If there is a match, the third signal will be considered a valid signal.

Other installed peripheral devices such as $D2_{Z1}$ in zone 1 and $D1_{Z2}$ in zone 2 operate in a similar manner. However, the generation of signals from either of these peripheral devices $D2_{Z1}$ and $D1_{Z2}$ may be offset in time from that of the peripheral device $D1_{Z1}$. For example, while the peripheral device $D1_{Z1}$ may have transmitted its third signal which includes the identification code $ID(D1)_{Z1}$ and the rolling code $RC(D1)_{Z1}(3)$, the peripheral device $D2_{Z1}$ in zone 1 will be generating its second signal which includes its identification code $ID(D2)_{Z1}$ and the rolling code $RC(D2)_{Z1}(2)$. While the rolling code $RC(D1)_{Z1}(3)$ associated with the peripheral device $D1_{Z1}$ may be generated using the same arithmetic equation as the rolling code $RC(D2)_{Z1}(2)$ associated with $D2_{Z1}$, the rolling codes $RC(D1)_{Z1}(3)$ and $RC(D2)_{Z1}(2)$ are different since they are offset in sequence. In alternate embodiments, different arithmetic equations may be used to generate the rolling codes $RC(D1)_{Z1}$ and $RC(D2)_{Z1}$.

In addition, while the peripheral devices $D1_{Z1}$ and $D2_{Z1}$ in zone 1 have generated their third and second signals respectively (and before they generate further signals), the peripheral device $D1_{Z2}$ in zone 2 may be activated to generate its first signal, which includes $ID(D1)_{Z2}$ and its initial rolling code $RC(D1)_{Z2}(1)$. While peripheral devices in two zones have been described, it is contemplated that one or more zones each having at least one peripheral device may be likewise monitored, thus providing a security system that provides increased security.

The above-described process may also be implemented using any one of the remote controllers 40. Each remote controller 40 may be used to disarm the security system 10 to facilitate entry to or exit from the premises, or to facilitate movement within a secured area.

A further aspect of the invention includes various embodiments of the signaling device 50. The security console 20 transmits a signal with an identification code and a rolling code for at least one signaling device, if present in the system, when the security console 20 receives a valid signal as described above. The signaling device 50 will produce a perceivable indication to alert designated personnel that there is a security breach. The signaling device 50 may employ a wide variety of mechanisms to produce the perceivable indication. Three embodiments are described below, one embodiment using a signal generator such as a bell to alert personnel on or near the premises, the second embodiment using a telephone autodialer to deliver a prerecorded message to off-site personnel, and a third embodiment using an autodialing speakerphone to deliver a prerecorded message to off-site personnel, to provide a voice channel for communication with the off-site personnel, and to allow the off-site personnel to aurally monitor the premises.

Figure 6A:
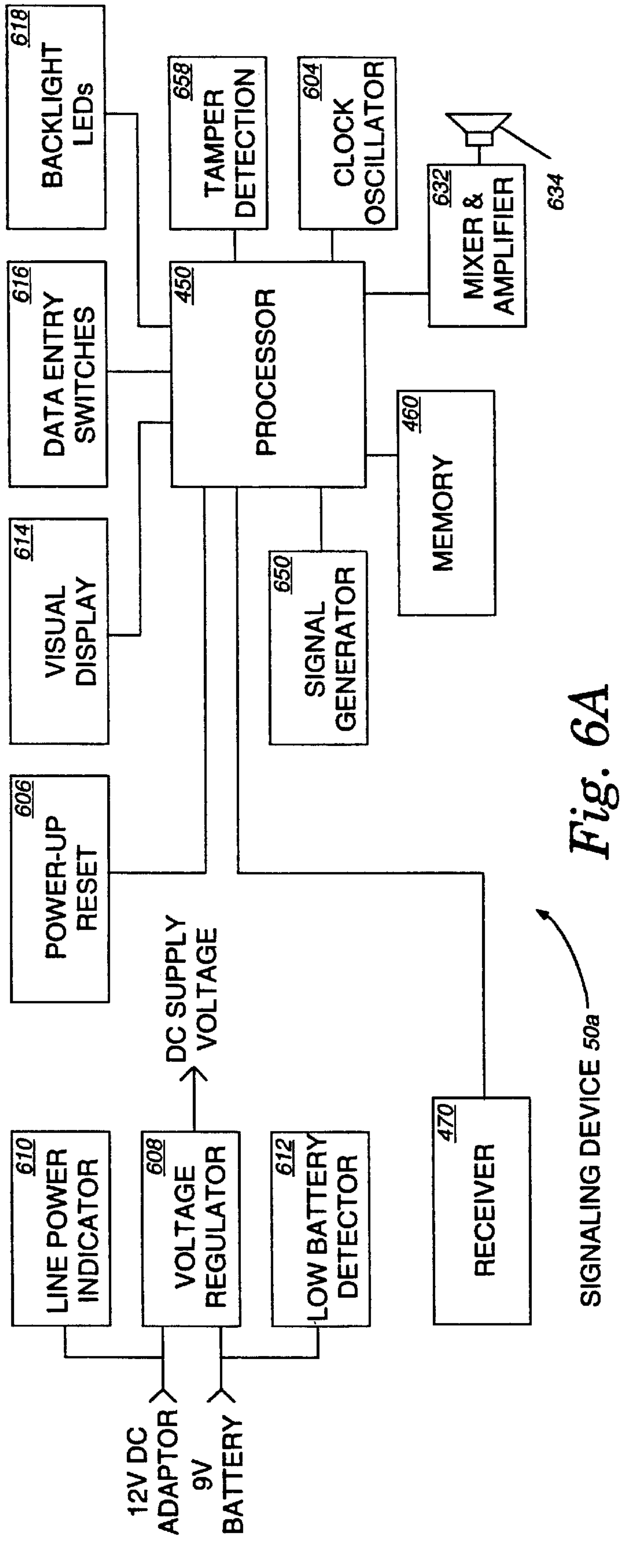
FIG. 6A is a detailed block diagram of one embodiment of a signaling device 50 of FIG. 1A.

FIG. 6A is a detailed block diagram of one embodiment of the signaling device 50 of FIG. 1A. The signaling device **50*a* of this embodiment comprises a processor 450, memory 460 such as a non-volatile memory, a clock oscillator 604, a power-up reset circuit 606, a voltage regulator 608 which receives current and voltage from a power source such as a 12V direct current (DC) source or a 9V battery, a line power indicator 610, a low battery detection circuit 612, a visual display panel 614, data entry switches 616 with LED backlight 618, a receiver 470 such as a radio frequency (RF) receiver, and a signal generator 650. The signal generator 650 is typically a sound generating device such as a bell or siren. In another embodiment, the signal generator 650** may be replaced by another perceivable indicator such as a strobe light.

In one embodiment, the signaling device 50 is powered by a line power adapter in normal operation. In the event of a line power failure, a 9-volt battery maintains operation of the signaling device 50. The line power indicator 610 provides a visual indication that wall power is being supplied. The low battery detection circuit 612 provides a visual indication when the battery level falls below a predetermined level. A voltage regulator 608 receives input voltage from the line power adapter and the battery and provides regulated power to all circuits of the signaling device 50.

In one embodiment, the processor 450 is a 4-bit microprocessor with built-in ROM, RAM, I/O, timer/counter, and liquid crystal display (LCD) driving circuitry. In one embodiment, an external RC clock oscillator 604 supplies a clock signal with a frequency of 4 MHz. Internally, the processor 450 operates at a divided-by-4 clock rate of 1 MHz. In one embodiment, a sub-system clock is used to place the processor 450 in a low power consumption mode; in one embodiment the sub-system clock supplies a frequency of 32.768 kHz. In another embodiment, a ceramic resonator is used to provide a more stable and accurate clock signal. In one embodiment, the timing tolerance for RF reception is chosen in the range of 25% to 30%, and, preferably, as 27%.

In one embodiment, the power-up reset timing circuit 606 comprises an RC network which determines the timing constant for enabling the processor 450 after power is applied. The power-up delay time enables the supply voltage to stabilize before the processor 450 starts operation.

In one embodiment, the memory 460 is provided by a EEPROM memory device. Non-volatile storage is required for the memory 460 because the rolling code format of RF data communication requires a sequence code which is calculated from the previously received sequence code. Therefore, the previously received sequence code must be maintained even after total power removal. Other system parameters, such as factory programmed options and device ID codes, can also take advantage of the non-volatile storage.

The interface unit includes data entry switches 616 which are backlit by LEDs 618, aural feedback via a speaker 634, and a visual display 614. The data entry switches 616 are provided to accept user input. The signaling device 50 includes features requiring user input such as real-time clock setting, telephone number entry, parameter setting, peripheral device programming, voice recording/playback, and system configuration. In one embodiment, data entry switches 616 provided include a four-by-four key matrix, a panic key which enables manual actuation of the signaling device 50, a tone/pulse selection switch to choose between tone and pulse dialing, and a pair of normally closed (NC) contacts which will activate the signaling device 50 if the connection of the contacts is broken.

The signaling device 50 provides audible tones which are processed by a mixer and amplifier 632 to drive the speaker 634. Beeping tones are generated by the processor 450 to indicate key depression as well as other audible warnings.

The visual display 614 is provided to provide a visual indication of system operating status. In one embodiment, the visual display 614 includes an LCD panel and an LED which indicates whether the signaling device 50 is armed or disarmed. During standby, the current time is displayed on the LCD. When the user enters data into the device, for example a clock setting, user input can be seen on the LCD to ensure correct entry.

In operation, the receiver 470 of the signaling device 50 (FIG. 6A) receives the data signal on an antenna and detects the signal using a super-regenerative detector circuit. The demodulated signal is then amplified and shaped by a two-stage amplifier to generate a digital signal for decoding by the processor 450. The data frame of the digital signal uses a rolling code format which means that the data content is different for each transmission. In one embodiment, each frame is about 0.144 second in duration and there is a separation time of about 0.06 second between each frame.

In one embodiment, the signaling device 50 includes a housing that encloses the above-described circuitry. The housing is coupled to tamper switches via a tamper detection circuit 658 which determines if the housing is subject to a predetermined level of pressure that is indicative of attempted or actual tampering or breakage. Upon detection of a level that is at or above a predetermined level of pressure, the processor 450 issues a command to activate the alarm.

As discussed earlier, the processor 450 receives signals from the receiver 470. The signals include a unique identification code 482 and a variable security or rolling code 484. The received signal is processed to determine if it is intended for the signaling device 50, and if so, to determine if it is a valid signal. If valid, the processor 450 activates an alarm, indicating that a security violation has occurred.

Transmissions initiated by the security console 20 to the signaling devices 50 are accomplished using a signal 280 having a unique identification code 282 and variable security (or rolling) code 284 in accordance with the present invention. FIG. 4C illustrates the format of the coded signal 480 transmitted from the security console 20 to the signaling device 50. The coded signal 480 includes a unique and fixed device identification code 482 of the security console 20 and a variable device identification code or rolling code 484. The security console 20 contains a software program that generates a different value for the variable security code 484 portion of the coded signal 480 for each transmission. The new value of the variable security code 484 is derived from the previous value by a predetermined arithmetic equation as calculated by the software program in the security console 20.

In one embodiment, the receiver 470 of the signaling device 50 is substantially identical to the RF receiver 150 of the security console 20. The receiver 470 comprises an antenna 152 (FIG. 3B) for receiving incoming signals, a coupling capacitor 154, an amplifier 156 for amplifying the received signals, a regenerative circuit 158 which performs equalization, timing and decision making processes on the received signals so as to minimize the effects of amplitude and phase distortions on the received signals, a low pass filter 160 for filtering the signals and another amplifier 162 which amplifies the filtered signal. The resulting signal is forwarded to the processor 450.

Software for calculating the variable security code 484 using the predetermined arithmetic equation is also installed in the signaling device 50. A device identification code 482 and an initial rolling 484 are stored in the non-volatile storage 460 of the signaling device 50. Since the arithmetic equation for generating the initial and subsequent instances of the rolling code 482 is stored in the memory of both the security console 20 and the signaling device 50, the signaling device 50 will be able to correctly identify subsequent transmissions from the security console 20.

During system initialization, the system console 20 generates a first coded signal 480 containing an identification code 482 and a first rolling code 484. The first coded signal 480 is received by the signaling device 50 and stored in the non-volatile storage 460. Upon detection of an alarm condition, the security console 20 will transmit a second coded signal 480 to the signaling device 50. This second signal from the security console 20 will include the identification code 482 and a second rolling code 484 generated in accordance with the predetermined arithmetic equation. Since the software for generating the rolling code 484 sequences is also installed on the signaling device 50, upon receipt of the second coded signal 480, the processor 450 will first generate the expected rolling code 484 associated with the identification code 482 and then compare the received second coded signal 480 with the identification code 482 and expected rolling code 484. If there is a match, the second coded signal will be considered a valid signal. In response, the signaling device 50 will activate the signal generator 650, to signal that there is a security breach. Since the rolling code 484 is variable, potential violation of the security system 10 of the present invention will be extremely difficult, especially in cases where the rolling code 484 includes a large string of numbers. As a result, the security of the premises will be greatly enhanced.

In one embodiment, the signaling device 50 will generate a plurality of rolling codes in the sequence that begins with the expected rolling code 484. If the received second coded signal 480 does not match the expected rolling code 484, the signaling device will compare the received second coded signal 480 with the plurality of following rolling codes. If there is a match with one of the following rolling codes, the second coded signal will be considered a valid signal. In this way, the signaling device 50 can resynchronize itself with the security console 20 in the event that transmissions from the security console 20 are not received by the signaling device 50. The number of following rolling codes generated by the signaling device 50 is chosen to maintain a high level of system security while providing tolerance for an acceptable number of missed transmissions. In one embodiment, about one thousand following rolling codes are generated by the signaling device.

Figure 6B:
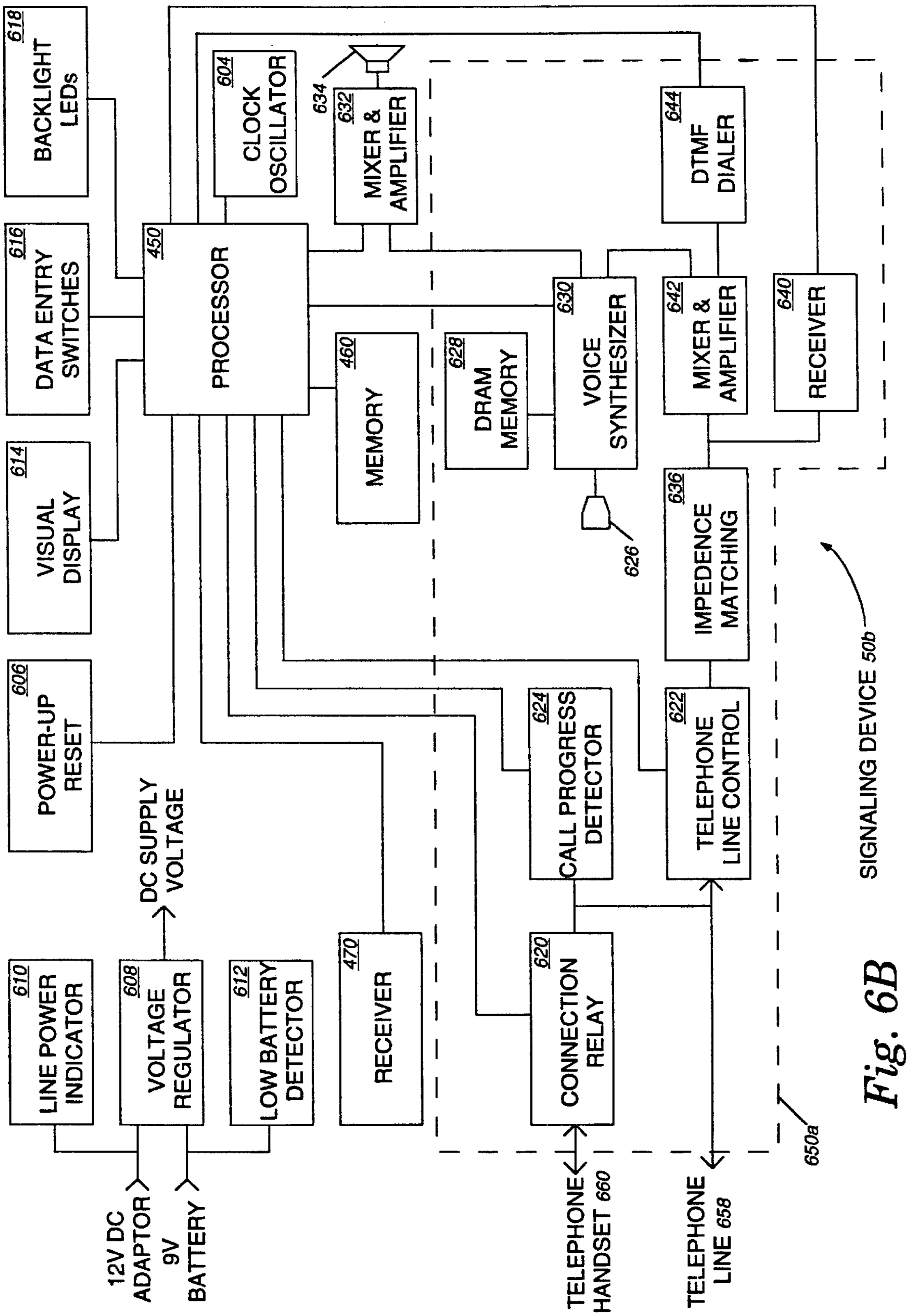
FIG. 6B is a detailed block diagram of another embodiment of a signaling device 50 of FIG. 1A that includes a telephone autodialer.

FIG. 6B is a detailed block diagram of an embodiment of a signaling device 50 of FIG. 1A in which the signal generator 650 of FIG. 6A is a telephone auto dialer 650*a* to deliver a pre-recorded message. In one embodiment, the signaling device 50*b* of this embodiment comprises the telephone auto dialer 650*a* which further comprises a connection relay 620 to disconnect a handset from the line when a call is to be placed by the auto dialer, a telephone line control circuit 622 to connect the signaling device 50*a* to the telephone line, a call progress detector circuit 624, a voice synthesizer 630 and memory 628 to provide voice messages to called parties, a dialer 644 to provide tone dialing, such as DTMF dialing, and a receiver 640 to receive tone signals from called parties. In one embodiment, the receiver 640 is a DTMF receiver. Two RJ-11 connectors are provided, one connected to the telephone line 658 and the other connected to a standalone telephone handset 660. The signaling device 50*b* can make use of an existing telephone line, thus saving the cost of leasing a separate telephone line.

Telephone line control 622 uses an opto-coupler for electrical isolation. The line control circuit 622 is also used for pulse dialing. Various incoming signals are detected by the device for control purpose. A call progress detector 624 amplifies, filters, and demodulates the call progress tones. The resulting waveforms indicate the cadence of the call progress tone. By analyzing the cadence pattern, the processor 450 can identify the call progress tone as a ringback tone, a busy tone, etc. The receiver 640 is used to detect a depression of a telephone key by the called party. In one embodiment, only a '#' key depression is recognized as acknowledgment by the called party to the playback message. Other key depression are ignored.

The data entry switches 616 accept user input such as telephone number entry, voice recording/playback selection, and tone/pulse selection to choose between tone and pulse dialing, In addition to illuminating the data entry switches 616, the backlight LEDs 618 blink if no emergency message is recorded.

The visual display 614 provides visual indications of system operating status. When the user enters a telephone number, user input can be seen on the LCD to ensure correct entry. When a telephone call is in progress, the most recent dialed number is displayed on the LCD.

Additional sound sources are combined with the tones generated by the processor 450 in the mixer and amplifier 632 to drive the speaker 634. The voice synthesizer 630 makes use of the speaker 634 for sound reproduction.

The dialer 644 generates tones for dialing and signaling. The tones and the output of the voice synthesizer 630 are combined in a mixer and amplifier 642 and then sent to the hybrid transformer 636 for coupling to telephone line. In one embodiment, the dialer 644 generates DTMP tones.

The voice circuitry uses a voice synthesizer 630 for sound recording and playback. The circuit consists of a voice encoder/decoder and separate DRAM storage 628. The external DRAM 628 stores the recorded message data which can be retrieved for future message playback. The voice record/playback time depends on the storage capacity of the DRAM 628, the number of DRAMs 628 used, and the quality of voice synthesis.

A microphone 626 enables the user to provide input to the voice synthesizer 630. Output of the voice synthesizer 630 is combined with the DTMF tone in a mixer and amplifier 642 and then sent to the hybrid transformer 636 for coupling to telephone line. The output of the voice synthesizer 630 is also combined with the processor 450 output in a mixer and amplifier 642 and sent to the speaker 634 to provide an audible indication of the transmission of the pre-recorded message. The voice synthesizer audio output is controlled by a muting circuit (not shown). During message playback period of the voice synthesizer 630, the audio signal to the speaker 634 can be suppressed without affecting the progress of message playback.

Figure 6C:
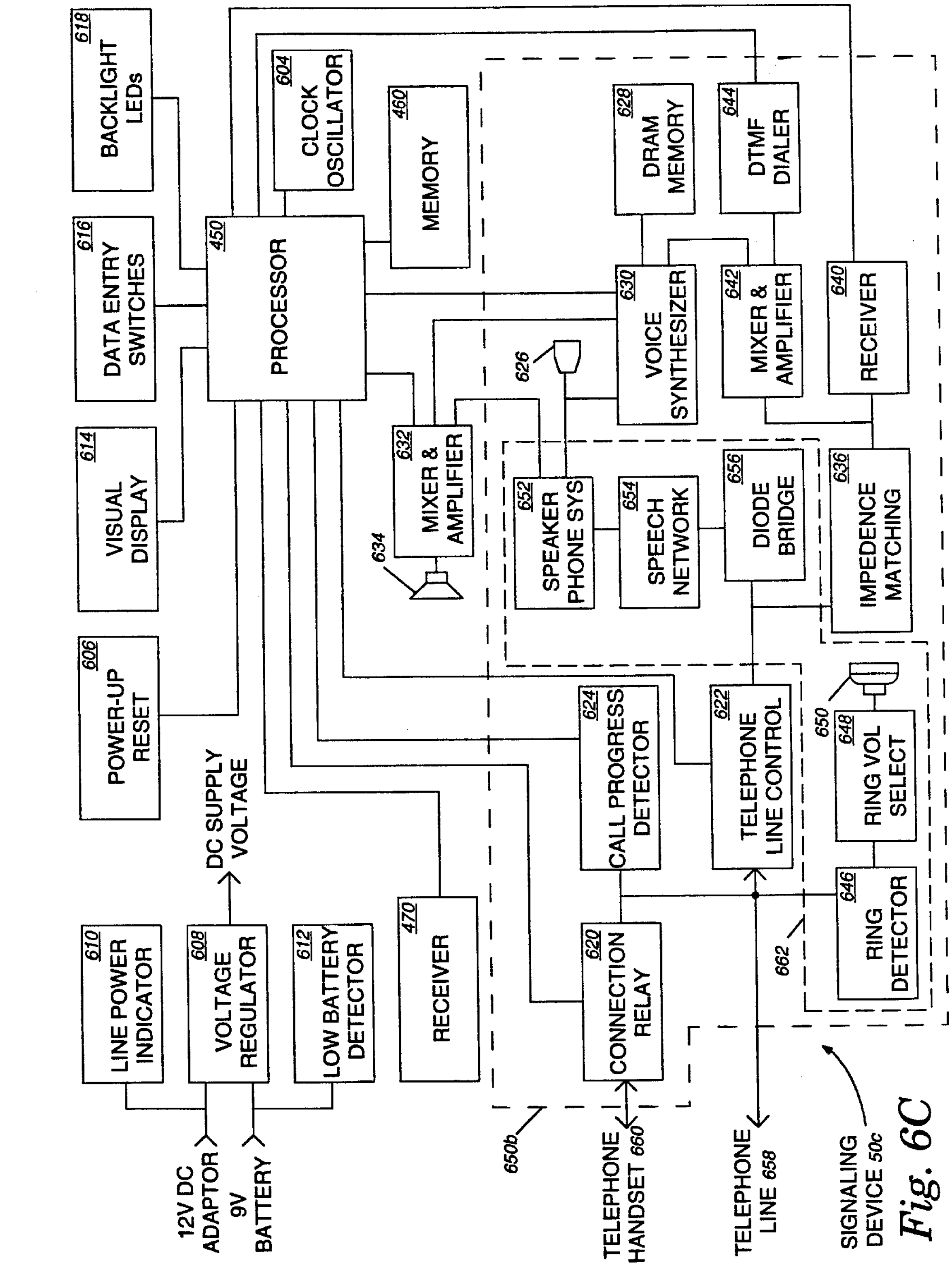
FIG. 6C is a detailed block diagram of another embodiment of a signaling device 50 of FIG. 1A that includes a telephone autodialer and speakerphone.

FIG. 6C shows another embodiment of a signaling device 50 of FIG. 1A in which the signal generator 650 of FIG. 6A is a telephone auto dialer 650*b* with speakerphone capability. One embodiment of the signaling device 50*c* is substantially similar to the embodiment of the signaling device 50*b* shown in FIG. 6B except that the signal generator 650*b* further comprises speakerphone circuits 662. The ring detector 646 detects a ringing signal from the telephone line and drives a piezo-electric buzzer 650 to generate a ringing sound. Different sound pressures can be selected by means of a slide switch that provides a ring volume selector 648. A speakerphone integrated circuit 652 incorporates the necessary amplifiers, attenuators, and control functions to produce a hands-free speakerphone system. Included inside the chip are a microphone amplifier, a power audio amplifier for the speaker, transmit and receive attenuators, a monitoring system for background sound and background level. Also included are all necessary regulated voltages for both internal and external circuitry. A sidetone network 654 and diode bridge 656 are implemented by external components. The visual display 614 further includes a 7-segment LED to indicate hook status and speed dialing number. The speaker 634 is used to provide audible output of the received telephone signal. The microphone 626, which is coupled to the voice synthesizer 630, is further coupled to the microphone amplifier input of the speakerphone integrated circuit 652. The power audio amplifier output of the speakerphone integrated circuit 652 is coupled to the mixer and amplifier 642 and sent to the speaker 634.

The present invention, as illustrated by the foregoing embodiments, provides a security system having increased security by having a control unit which operates with a number of peripheral devices, each having different identification codes which cannot be easily detected. In addition, the present invention provides a security system which improves receiver immunity to spurious signals by using a different data frame pattern during each transmission.

While the preceding description has been directed to particular embodiments, it is understood that those skilled in the art may conceive modifications and/or variations to the specific embodiments and described herein. Any such modifications or variations which fall within the purview of this description are intended to be included therein as well. It is understood that the description herein is intended to be illustrative only and is not intended to limit the scope of the invention. Rather the scope of the invention described herein is limited only by the claims appended hereto.

What is claimed is:

1. A security system comprising:

a security device that wirelessly receives one or more signals from one or more respective transmitter units;

a signaling device located in wireless communication with the security device comprising:

a first circuit to wirelessly receive the first coded signal from said security device, said first coded signal including a first identification code and a first rolling code;

a memory that stores a second code, said second code including a second identification code and a second rolling code;

a second circuit coupled to said first circuit and said memory, said second circuit to compare said first code with said second code, said second circuit to generate an output signal if said first code matches said second code; and an annunciator circuit coupled to said second circuit, said annunciator circuit to provide a perceivable indication in response to said output signal.

2. The signaling device of claim 1, wherein said second rolling code changes in response to said first code matching said second code.

3. The signaling device of claim 1, wherein said signaling device further comprises a third circuit coupled to said second circuit and said memory, said third circuit determining a next value from a predetermined sequence if said second circuit generates said output signal, and said third circuit storing said next value in said memory as said second rolling code.

4. The signaling device of claim 1, wherein said annunciator circuit further comprises an auto dialing telephone device, wherein providing said perceivable indicator comprises initiating a telephone call.

5. The signaling device of claim 1, wherein said signaling device further comprises a housing that encloses said first circuit, said memory and said second circuit, said housing being coupled to a tamper circuit that generates a tamper signal upon detection of a predetermined pressure value.

6. The signaling device of claim 5, wherein said signaling device further comprises said annunciator circuit coupled to said tamper circuit, said annunciator circuit to provide said perceivable indicator if said tamper circuit generates said tamper signal.

7. A security system method, comprising:

wirelessly transmitting, by one or more devices each including a sensor and a transmitter, a code in response to actuation of said sensor;

wirelessly receiving said code, by a security console;

comparing said code with a second code;

wirelessly transmitting a third code including a third identification code and a third rolling code if said code matches said second code;

wirelessly receiving, by a remote device, said third code;

comparing said third code with a fourth code including a fourth identification code and a fourth rolling code; and providing an indication that a security violation has occurred if said third code matches said fourth code.

8. The method of claim 7, further comprising changing said second rolling code if said received first code matches said stored second code.

9. The method of claim 7, further comprising, determining a next value from a predetermined sequence for said second variable code if said received first code matches said stored second code, and storing said next value as said second rolling code.

10. The method of claim 7, wherein providing an indication that a security violation has occurred if said third code matches said fourth code comprises initiating a telephone call by an auto dialing telephone device.

11. The method of claim 7, further comprising generating a tamper signal upon detection of a predetermined pressure value in a housing that encloses said remote device.

12. The method of claim 11, further comprising providing an indication that a security violation has occurred by said remote device upon detection of said predetermined pressure value. value.

13. A security system comprising:

one or more devices each including a sensor and a transmitter, each transmitter to wirelessly transmit a code in response to actuation of said sensor;

a security console to receive said code, compare said code with a second code, and wirelessly transmit a third code including a third identification code and a third rolling code if said code matches said second code; and a remote device to wirelessly receive said third code, compare said third code with a fourth code including a fourth identification code and a fourth rolling code, and to indicate that a security violation has occurred if said third code matches said fourth code.

14. The security system of claim 13, wherein said remote device changes said fourth rolling code in response to said third code matching said fourth code.

15. The security system of claim 13, wherein said remote device indicates that a security violation has occurred by enabling a siren.

16. The security system of claim 13, wherein said remote device indicates that a security violation has occurred by initiating a telephone call using an auto dialing telephone device.

17. The security system of claim 13, wherein each transmitter transmits a code including an identification code and a rolling code in response to actuation of said sensor, and said security console compares said code with a second code including a second identification code and a second rolling code.

18. The security system of claim 13, wherein the one or more devices are located in one or more zones.

* * * * *